Figure 1:
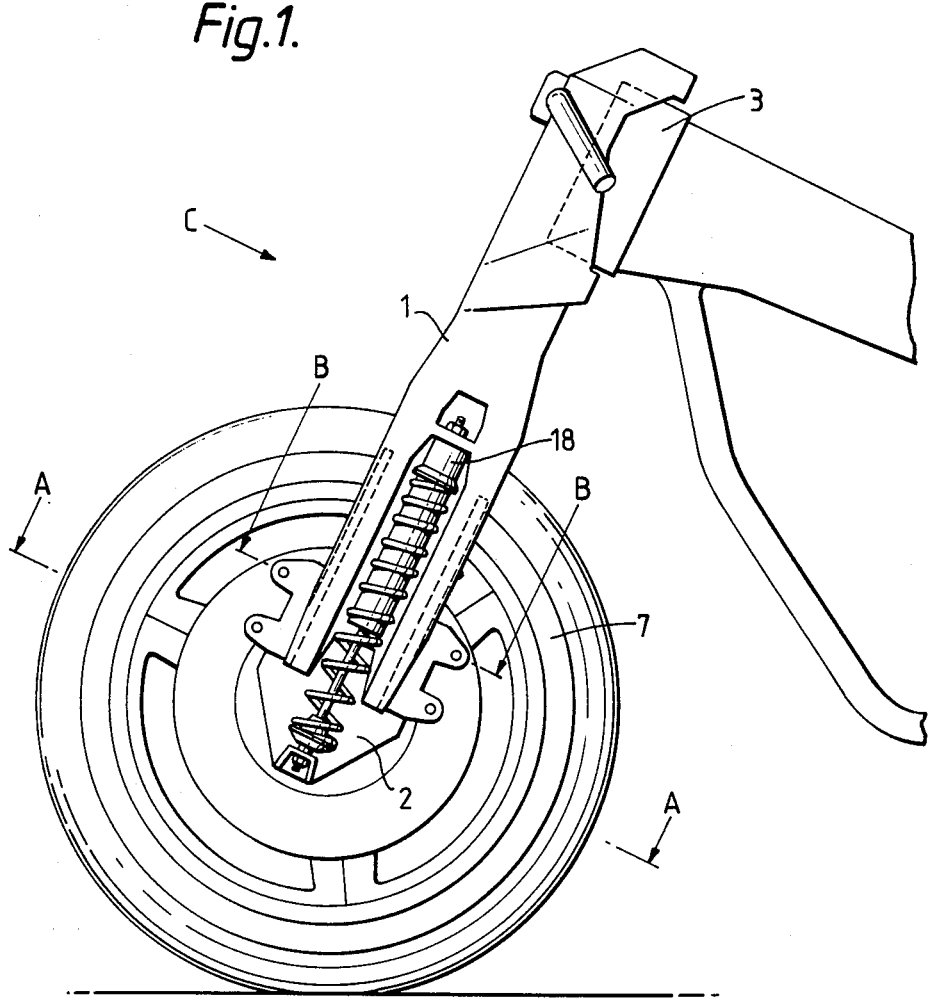

United States Patent [19]

Verkuylen

[11] Patent Number: 4,875,543
[45] Date of Patent: Oct. 24, 1989

[54] FRONT WHEEL SUSPENSION FOR MOTORCYCLES

[75] Inventor: Adrianus H. I. Verkuylen, Malden, Netherlands

[73] Assignee: Willem Peters, Weurt, Netherlands

[21] Appl. No.: 202,202

[22] Filed: Jun. 3, 1988

[30] Foreign Application Priority Data

Jun. 12, 1987 [NL] Netherlands ............... 8701364

[51] Int. Cl.⁴ .................................. B62K 25/04
[52] U.S. Cl. ........................ 180/219; 280/275; 280/670; 280/701
[58] Field of Search .............. 180/219; 280/275, 276, 280/277, 670, 696, 701

[56] References Cited

U.S. PATENT DOCUMENTS 2,953,395  9/1960  Turner ........................ 280/276
4,455,032  6/1984  Kajikawa .................... 280/276

Primary Examiner—Kenneth R. Rice
Attorney, Agent, or Firm—Price, Heneveld, Cooper, DeWitt & Litton

[57] ABSTRACT

Front wheel suspension system for motorcycles comprising relatively spring-mounted elements being associated to the front wheel on the one side and to the ball-head of the motorcycle on the other side. Said spring-mounted elements are constituted on the one side by one single support arm, which arm is connected to the ball-head of the motorcycle and extends along only one side of the front wheel and is provided with guide means, and on the other side by a shift piece, which shift piece is rotatably connected to the shaft of the front wheel and is also provided with guide means, the guide means of said support arm and of said shift piece cooperating with each other. A shock damper means is connected on the one side to the front wheel through the shift piece and on the other side to the support arm.

21 Claims, 3 Drawing Sheets

Fig.2.
Fig.3.
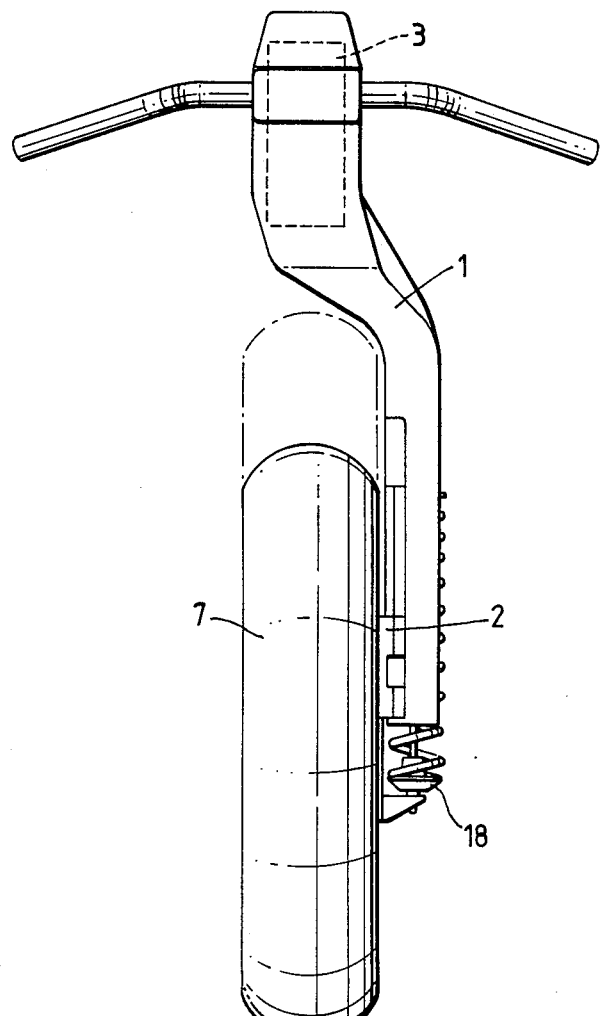
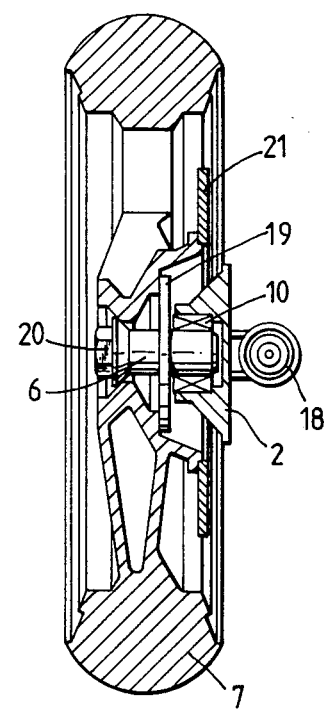

FRONT WHEEL SUSPENSION FOR MOTORCYCLES

The present invention relates to a front wheel suspension system for motorcycles, comprising elements which are spring-mounted with respect to each other and are associated to the front wheel on the one side and to the ball-head of the motorcycle on the other side.

In well known front wheel suspension systems of this type, the socalled telescoping fork types, the spring-mounted elements are constituted by telescoping tubes which are arranged on both sides of the front wheel, in which the undermost tubes are mounted on the front wheel and the uppermost tubes are mounted on the ball-head of the motorcycle. In that embodiment the lowermost tubes can form the outer tubes, the uppermost tubes being the inner tubes or just the reverse. An elastic element or hydraulic shock damper means is inserted in the telescoping tubes. Sealing rings are arranged between the tubes in order to seal the tubes against oil and dust. This known telescoping fork has the disadvantage that the relatively heavy sealings rings and slide bearings cause a certain starting friction with the result that the fork is rather insensible to absorb little shocks. Moreover, the telescoping fork is rather sensible to bending forces: undesirable forces are exerted on the slide bearings. Especially on braking excessive bending forces are exerted on the fork.

The object of the present invention is to obviate said disadvantages. To this end the front wheel suspension system of the present invention is characterised in that said spring-mounted elements are constituted on the one side by only one single support arm, which arm is connected to the ball-head of the motorcycle and extends along one side of the frontwheel and is provided with guide means, and on the other side by a shift piece, which shift piece is rotatably connected to the shaft of the front wheel and is also provided with guide means, the guide means of said support arm and of said shift piece cooperating with each other, and that a shock damper means is connected on the one side to the frontwheel through the shift piece and on the other side to the support arm.

Through the measures of the present invention a front wheel suspension system is obtained which is considerably less sensitive to bending forces. A distinct advantage is further that a separate shock damper is used which provides for more possibilities with respect to both the construction and the adjustment : in the front wheel suspension system according to the present invention the damping and guiding are separated from each other. Moreover the socalled unsprunged weight is relatively low which offers advantages too. Inspite of the fact that the front wheel suspension system according to the present invention is produced with only one overhanging arm the steering movements are transmitted exactly to the front wheel and that without play thanks to the guiding between the support arm and the shift piece. Preferably the guide means are formed as substantially straight guide ways.

In a preferred embodiment of the front wheel suspension system according to the present invention the shift piece is provided with a groovelike chamber opening at the side opposed to the front wheel shaft, in which chamber a pair of guide ways are formed being symmetrical to the front wheel shaft, said guide ways cooperating with a pair of guide ways being formed on the outside of the support arm, in which the guide ways of both the support arm and the shift piece are substantially V-shaped in cross-section. Preferably the guide ways of both the support arm and the shift piece are coated with a wear resistent material which offers the possibility to manufacture the support arm and the shift piece from a light weight material, such as aluminum, in which e.g. hardened steel as the wear resistent material can be chosen. Preferably needle bearings are provided between the guide ways of both the support arm and the shift piece or between the wear resistent coating materials of such guide ways. In a preferred embodiment the shift piece is fixed on the shaft of the front wheel by the intermediary of a wheel bearing.

In a preferred embodiment of the present invention the support arm is provided with a chamber being substantially symmetrical with respect to the shaft of the front wheel and opening on the side opposed to the front wheel shaft, in which the shock-damper means are placed substantially in the chamber of the support arm, the axes of the front wheel shaft and of the shock-damper means respectively being substantially perpendicular to each other.

Figure 4:
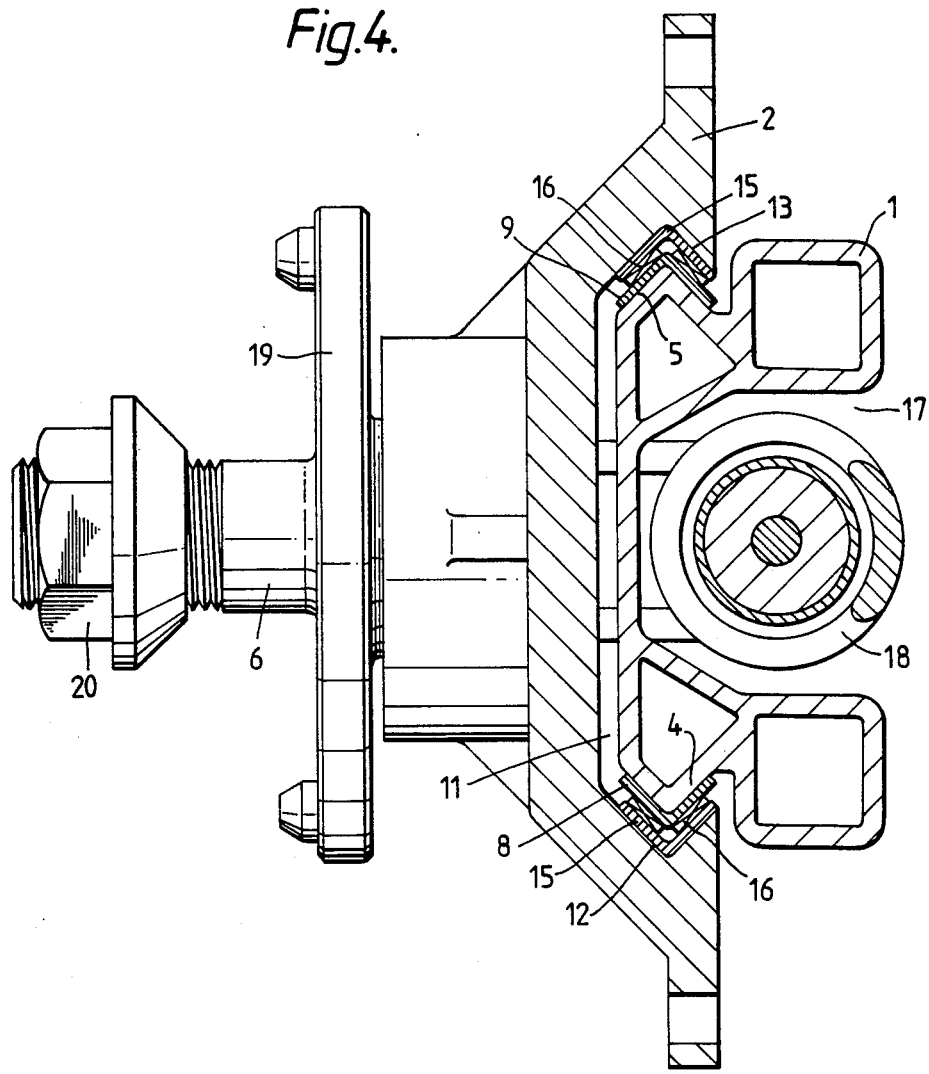

By way of example a preferred embodiment of the front wheel suspension system according to the present invention is explained further with reference to the accompanying drawings, in which:

FIG. 1 is a side view of a front wheel of a motorcycle having a suspension system according to the invention, FIG. 2 is a front view of the front wheel and suspension system according to line C—C in FIG. 1, FIG. 3 is a cross-sectional view according to line A—A in FIG. 1, and FIG. 4 shows on an enlarged scale a cross-section of the front wheel suspension according to line B—B in FIG. 1.

As shown in the drawings the front wheel suspension system according to the present invention comprises essentially a pair of elements being spring-mounted with respect to each other and consisting of one single support arm 1 and a shift piece 2. The support arm 1 is connected to the ball-head 3 of the motorcycle and has a bended configuration (see front view of FIG. 2) such that said support arm extends along one side of the front wheel 7. The support arm 1 is provided with guide means which in the example of the embodiment shown in the figures are formed as a pair of substantially straight guide ways 4, 5 on the outside of the arm said guide ways being substantially V-shaped in cross-section (see FIG. 4) and extending substantially symmetrically with respect to the shaft 6 of the front wheel 7 and being coated with a wear resistent material 8, 9. Through the intermediary of a wheel bearing 10 the shift piece 2 is rotably mounted on the shaft 6 of the front wheel 7. The shift piece 2 is also provided with guide means which cooperate with the guide means of the support arm 1. In the example of the embodiment shown in the figures the shift piece 2 is provided with a groovelike chamber 11 opening at the side opposed to the front wheel shaft 6 in which chamber a pair of substantially straight guide ways 12, 13 are formed. Said guide ways 12, 13 are substantially V-shaped in cross-section and are symmetrical to the front wheel shaft and are also coated with a wear resistent material 14, 15. Coating the guide ways with a wear resistent material offers the possibility to manufacture both the support arm and the shift piece from a light weight material, such as aluminium, while as the resistent material e.g.

hardened steel can be used. Needle bearings 16 are inserted between the wear resistant materials of the guide ways 4, 12 and 5, 13 of the support arm and the shift piece respectively.

The support arm 1 comprises a chamber 17 which is substantially symmetrical with respect to the front wheel shaft and opens at the side opposed to said front wheel shaft. A shock damper 18 being constructed in a manner known per se is placed in said chamber 17 and is connected to the support arm 1 on the one side and to the shift piece 2 on the other side. The shock damper 18 is arranged in such a way that the axes of the shock damper 18 and the shaft 6 of the front wheel 7 are perpendicular to each other.

As appears especially from FIG. 3 the front wheel shaft 6 is provided with a hub 19 that is an integral part of the shaft and against which hub the front wheel is mounted on the shaft 6 by means of a wheel nut 20. Finally a usual disc brake 21 is present the constructive details of which are not shown further herein.

I claim:

1. Front wheel suspension system for motorcycles comprising elements which are spring-mounted with respect to each other and are connected to the front wheel at one end and to the ball-head of the motorcycle on the other end, said suspension system characterised in having a spring-mounted element which is constituted by a single support arm, which arm is connected to the ball-head of the motorcycle and extends along only one side of the frontwheel and said support arm is provided with guide means and on the side adjacent the wheel being provided with a shift piece, to which shift piece is rotatably connected a shaft for the front wheel, said shift piece also being provided with guide means, the guide means of said support arm and of said shift piece cooperating with each other, spring means and a shock damper means connected on one end to the frontwheel through the shift piece and on the other end to the support arm; said shift piece being provided with a groovelike chamber opening at the side thereof opposite from the front wheel shaft, in which chamber a pair of guide ways are formed symmetrically of the front wheel shaft, said guide ways cooperating with a pair of guide ways formed on the outside of the support arm.

2. Front wheel suspension system according to claim 1, characterised in that needle bearings are provided between the guide ways of the support arm and the shift piece.

3. Front wheel suspension system according to claim 1, characterised in that the guide ways of both the support arm and the shift piece are substantially V-shaped in cross-section.

4. Front wheel suspension system according to claim 1, characterised in that the guide ways of both the support arm and the shift piece are coated with a wear resistant material.

5. Front wheel suspension system according to claim 4, characterised in that needle bearings are provided between the guide ways of the support arm and the shift piece.

6. Front wheel suspension system according to claim 1, characterised in that the shift piece is fixed on the shaft of the front wheel by the intermediary of a wheel bearing.

7. Front wheel suspension system according to claim 1, characterised in that the support arm is provided with a chamber, said chamber being substantially symmetrical with respect to the shaft of the front wheel and opening on the side opposed to the front wheel shaft and the shock-damper means being located substantially in the chamber of the support arm, the axes of the shaft of the front wheel and of the shock-damper means respectively being substantially perpendicular to each other.

8. Front wheel suspension system for motorcycles comprising elements which are spring-mounted with respect to each other and are connected to the front wheel on one end and to the ball-head of the motorcycle on the other end, characterised in that said spring-mounted elements are provided in a single support arm, which arm is connected to the ball-head of the motorcycle and extends along only one side of the frontwheel; a shift piece; said arm mounting the shift piece on one side; said guide ways on said arm being formed on the outside thereof; said shift piece having internal guide ways, said guide ways on both said shift piece and said arm being straight; a shaft for the front wheel rotatably mounted on said shift piece, said shift piece being provided with a groove-like chamber symmetrically opposed to the frontwheel shaft guide ways, the guide ways of said support arm and of said shift piece operatively cooperating with each other to maintain alignment between said support arm and said shift piece; shock damper means connected at one of its ends to the frontwheel through the shift piece and on the other of its ends to the support;

9. Front wheel suspension system for motorcycles comprising elements which are spring-mounted with respect to each other and are connected to the front wheel at one end and to the ball-head of the motorcycle on the other end, said suspension system characterised in having a single support arm, which arm is connected to the ball-head of the motorcycle and extends along only one side of the frontwheel and said support arm which is provided with guide means on the side adjacent the wheel being provided with a shift piece, to which shift piece a shaft for the front wheel is rotatably connected, said shift piece also being provided with guide means, the guide means of said support arm and of said shift piece cooperating with each other, spring means and a shock damper means connected on one end to the frontwheel through the shift piece and on the other end to the support arm; side guide means on both said support arm and said shift piece being substantially V-shaped in cross section and interfitting with each other.

10. Front wheel suspension system according to claim 9, wherein the guide ways of both the support arm and the shift piece are coated with a wear resistent material.

11. Front wheel suspension system according to claim 10, characterised in that the support arm is provided with a chamber, said chamber being substantially symmetrical with respect to the shaft of the front wheel and opening on the side opposed to the front wheel shaft, the shock-damper means being located substantially within the chamber of the support arm, the axes of the shaft of the front wheel and of the shock-damper means respectively being substantially perpendicular to each other.

12. Front wheel suspension system according to claim 9, characterised in that needle bearings are provided between the guide ways of the support arm and the shift piece.

13. Front wheel suspension system according to claim 12, characterised in that the support arm is provided with an elongated chamber the centerline of which is substantially symmetrical with respect to the shaft of the front wheel, said chamber opening on the side of said support arm opposite from the front wheel shaft, said shock-damper means being in said chamber, the axes of the shaft of the front wheel and of the shock-damper means respectively being substantially perpendicular to each other.

14. Front wheel suspension system according to claim 9, characterised in that the support arm is provided with a chamber, said chamber being substantially symmetrical with respect to the shaft of the front wheel and opening on the side opposed to the front wheel shaft, the shock-damper means being located substantially within the chamber of the support arm, the axes of the shaft of the front wheel and of the shock-damper means respectively being substantially perpendicular to each other.

15. A front wheel suspension system for a motorcycle, said system having a single support arm, the upper end of which is secured to the ball-head of the motorcycle and the lower portion of which is laterally offset to provide a space to receive a front wheel the centerline of which is aligned with the centerline of the cycle's ball-head, said lower portion providing a first pair of spaced parallel first guide ways, one facing forwardly and the other rearwardly; a slide having a pair of second guide ways adapted to slidably receive said first guide ways therein; friction reducing means between said first and second guide ways whereby one of said first and second guide ways may move relative to the other; a shaft for mounting a front wheel rigidly secured to said slide midway between said first guide ways; shock absorbing means midway between said guide ways connected at one of its ends to said slide and at the other of it ends to said support arm and extending parallel to said guide ways and offset therefrom oppositely from said front wheel for absorbing vertical movements of the wheel as it passes over a supporting surface.

16. A front wheel suspension system as described in claim 15 wherein said friction reducing means are needle bearings.

17. A front wheel suspension system as described in claim 16 wherein said first and second guide ways are V-shaped in cross section.

18. A front wheel suspension system as described in claim 17 wherein separate sets of bearings are provided on each side of the apices of said slides.

19. A front wheel suspension system as described in claim 18 wherein said bearings are needle bearings.

20. A front wheel suspension system as described in claim 15 wherein said shock absorbing means is a spring.

21. A front wheel suspension system as described in claim 20 wherein the lower end of said spring is secured to said slide.

* * * * *